March 10, 1931.  F. H. OWENS  1,796,121
SLIT HOLDER FOR SOUND CAMERAS
Filed Dec. 10, 1926  2 Sheets-Sheet 2
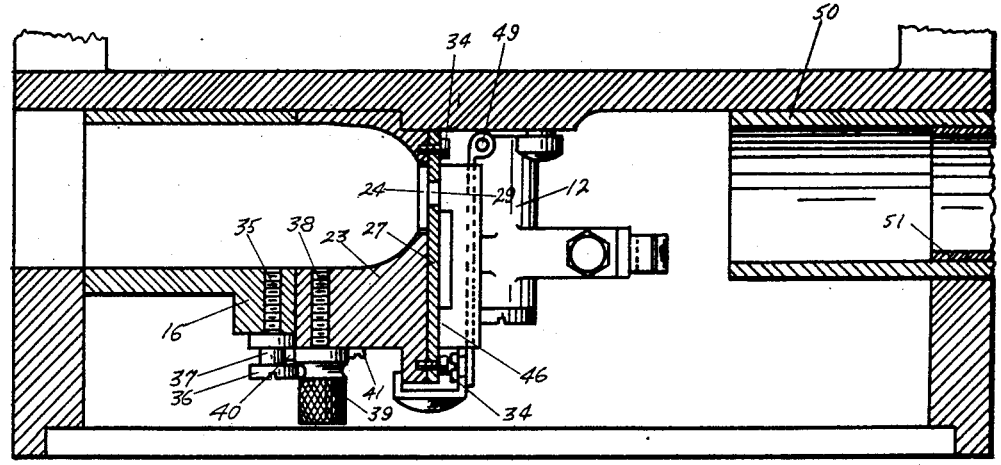
Fig. 2.
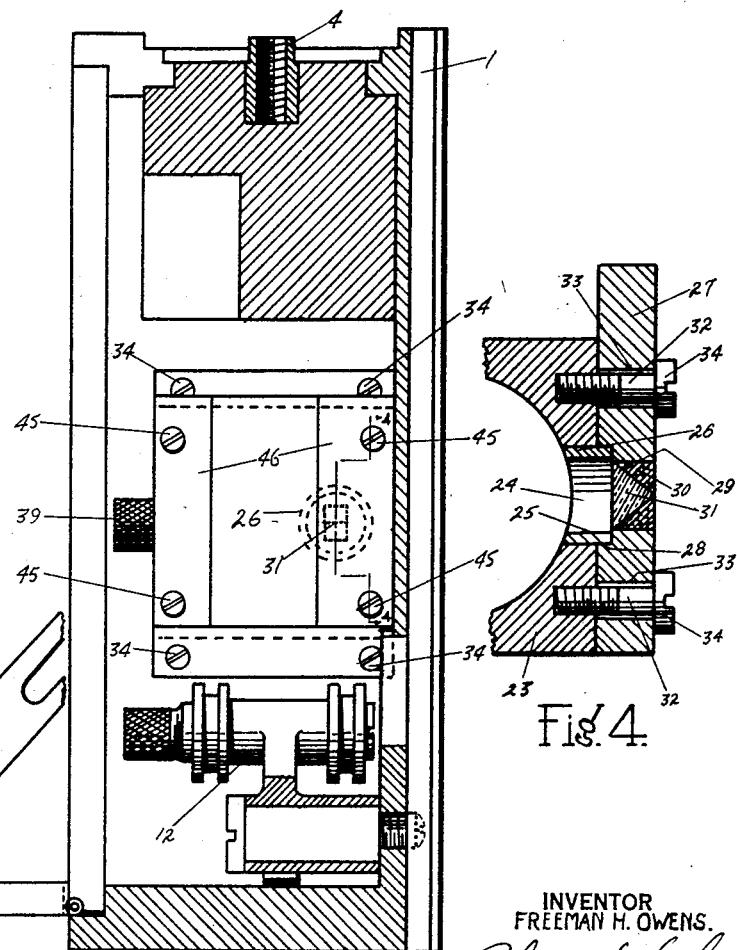
Fig. 3.
Fig. 4.
INVENTOR
FREEMAN H. OWENS.
BY
ATTORNEY Patented Mar. 10, 1931

1,796,121

UNITED STATES PATENT OFFICE

FREEMAN H. OWENS, OF NEW YORK, N. Y.

SLIT HOLDER FOR SOUND CAMERAS

Application filed December 10, 1926. Serial No. 153,938.

In the recording and reproducing of sound on photographic film, there is of course provided a slit or narrow aperture through which the light passes to the photographic film which is driven past the slit and usually in direct engagement therewith. As this slit must be properly adjusted with respect both to its position on the film and to its position with the light, means must be provided for permitting such adjustments and for securely holding the slit in its adjusted position. As the slit is almost microscopic in size, it will be readily understood that these adjustments must be very fine and accurate in order to properly record or reproduce the sound.

By my invention, I have provided a novel type of holder for the slit, in which the slit is rigidly secured, and have made provisions for the adjustment of said slit holder, whereby the slit may be quickly and accurately positioned properly with respect to the film and light.

Many objects and advantages in details of construction and arrangement of parts will be apparent as the description proceeds, reference being had to the accompanying drawings wherein like reference numerals indicate like parts.

In the drawings:—

Figure 2 is a cross section of the camera taken on the line 2—2 of Figure 1.

Figure 3 is a cross section of the camera taken on the line 3—3 of Figure 1.

Fig. 4 is a cross section taken on the line 4—4 of Fig. 3.

Figure 1:
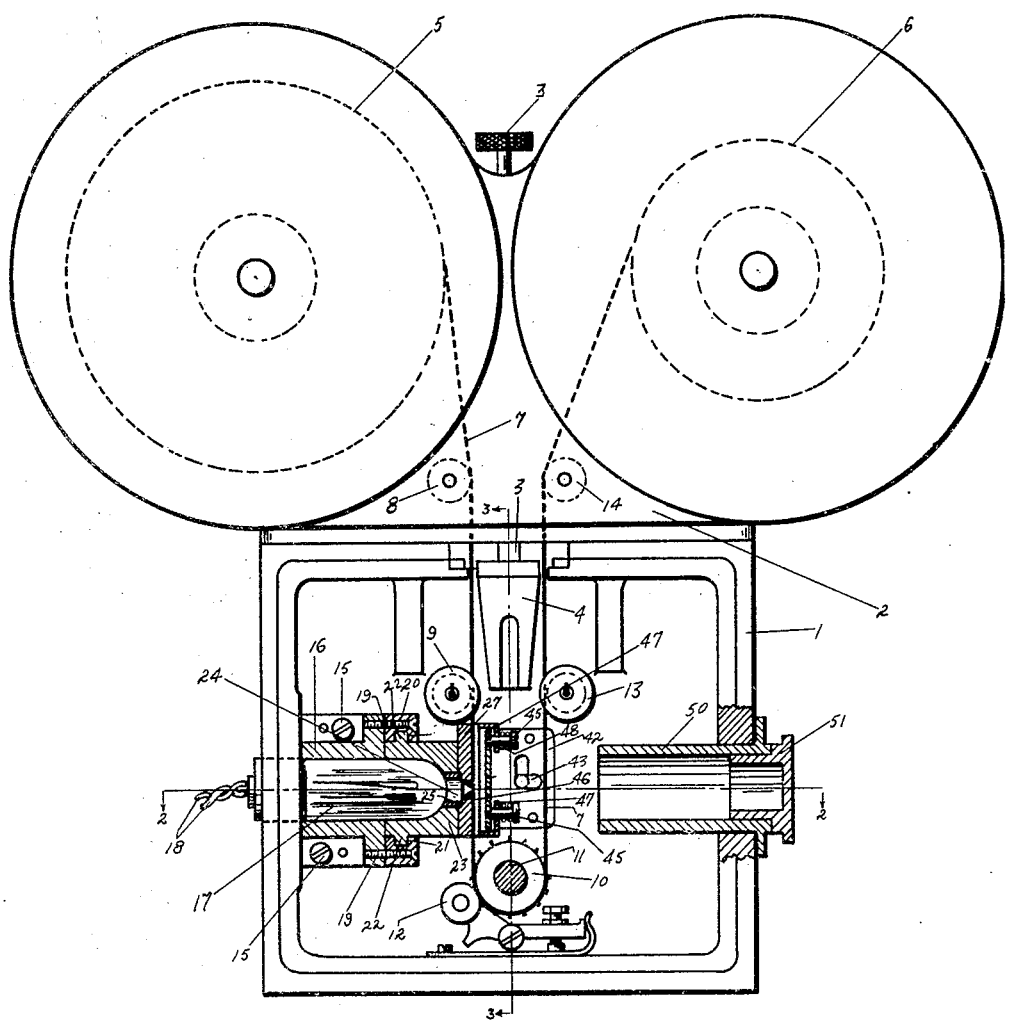
Figure 1 is a side elevation of a sound camera embodying my invention, one side of the camera being removed and certain parts being shown in section for the purpose of clearness.

In Figure 1 is illustrated generally a sound recording camera comprising a suitable casing 1 on top of which is secured a film reel housing 2 secured to the casing 1 as by means of a clamping screw 3 engageable at its lower end within the internally threaded socket 4 (see Figure 3) in the casing 1. The reel housing 2 is provided with a film supply reel 5 and a film take up reel 6. Any suitable means (not shown) may be provided for rotating the take up reel 6. The sensitized film 7 passes downwardly from the supply reel 5 over a guide roller 8 and through suitable openings in the bottom of the reel housing 2 and the top of the camera casing 1, over a second guide roller 9, past the recording mechanism to be described, and around the driving sprocket 10 mounted on the shaft 11, which may be driven at a constant speed by any suitable source of power (not shown). A friction roller 12 of any standard design is provided for engagement with the film 7 against the sprocket 10 to insure the proper engagement of the sprocket teeth within the usual perforations on the film.

After passing around the sprocket 10, the film 7 again turns upwardly past the guide rollers 13 and 14 where it is secured to the take up reel 6 to be wound thereon.

Secured to one wall of the casing 1 as by screws 15 is a hollow boss 16 adapted to receive a lamp 17 of the type commonly used for recording sound photographically. Such lamps are known in the art and need not be described in detail. Suffice it to say that it is extremely sensitive and when sound vibrations or waves are converted into electric impulses, and such impulses imposed upon the current of the lamp 17 through the wires 18, the intensity of the actinic light of the lamp 17 varies exactly in proportion to the variation in the sound waves.

Secured to the inner face of the boss 16 as by the screws 19, is a guide member 20 provided with grooves 21 forming a slideway adapted to receive the shoulders 22 of a supporting member 23 internally formed to receive the end of the lamp 17 projecting beyond the boss 16.

The support 23 is provided in its front face with an opening 24 through which the light from the lamp 17 may pass. Secured within the opening 24 is a ring 25, which if desired, may be integral with the support 23, and which projects slightly beyond the face of the support 23 to form a shoulder or bearing 26 for rotatably supporting the slit carrier 27 recessed as at 28 and mounted upon the bearing 26. In this instance the slit carrier 27 compirses a plate provided with an opening 29 in alignment with the opening 24 and the support 23. In this opening 29 is suitably secured as by the cement 30, the slit member 31 which may be in the form of a prism (shown clearly in Figure 4), the apex of which is flush with the outer surface of the carrier 27 and past which the film 7 is moved and held in contact therewith during such movement. Obviously, a very small beam of light will pass through the narrow edge of the prism 31 to the film 7.

The carrier 27 is so mounted on the support 23 as to permit a slight rotary movement of the carrier on the bearing 26 in order that the narrow slit 31 may be adjusted to a perfectly horizontal position with respect to the lamp and the film 7. This mounting comprises set screws 32 passing through the openings 33 slightly larger in diameter than the set screws 32, and having screw threaded engagement within the support 23. The heads 34 of the set screws are adapted to bear against the face of the carrier 27 and clamp the same in adjusted position. Only a very slight rotary movement is necessary on the part of the carrier 27 for proper adjustment of the slit to horizontal position.

Referring now to Figure 2, there is provided on the boss or lamp housing 16, a screw 35 provided with a head 36 which is formed with a groove 37. The support 23 is likewise provided with a screw 38 provided with a knurled head 39 and carrying a lug 40 adapted to be turned into the groove 37 on the head 36 after the carrier 23 has been moved into the slideway 21. When it is desired to remove the carrier 23, the knurled head 39 is turned to withdraw the lug 40 from the groove 37, whereupon the carrier may be pulled out. A stop member 41 is provided on the carrier 23 against which the lug 40 may be turned when out of engagement with the head 36.

The mechanism just described permits the lateral adjustment of the support 23 and consequently the carrier 27. With the parts in the position shown in Figure 2, it will be obvious that rotation of the headed screw 36 will result in the lateral adjustment of the support 23 in the slideway 21. This permits the proper adjustment of the slit 31 with respect to the film 7. This adjustment is also very slight because the sound record is necessarily small, usually being placed adjacent the edge of the film either between the perforations and the edge, or between the picture receiving portion of the film and perforations. Although both this lateral adjustment and the rotary adjustment for the slit 31 are very small, they are absolutely essential to the operation of a device of this character, and therefore form an all important part of the invention.

A gate is provided to normally bear against the film 7 and hold it in engagement with the carrier 27 and the slit 31. This gate comprises a plate 42 which may be removably secured to one wall of the casing, as by means of the turn button 43. The plate 42 is provided with a right angled portion 44 upon which are mounted the pins 45. A presser pad 46 is provided with flanges 47 turned over the rear side of the angle plate 44, and through which flanges the pins 45 pass. Coil springs 48 engage around the pins 45 between the heads thereof and flanges 47 whereby the presser pad 46 is resiliently held in engagement with the film and holding said film in engagement with the carrier 27 and slit 31. As shown in Figure 2, this gate may be pivoted as at 49 so that the same may be swung away from the film to permit the threading thereof through the camera, and also to permit the proper adjustment of the slit holder. In connection with this adjustment, there is provided in the casing 1, a tube 50 extending from the outside of the casing inwardly and in alignment with the slit holder. A cap 51 is provided to normally close this tube but if it is desired to adjust the slit holder, the cap 51 is removed and a microscope placed in the tube 50, the gate either removed from the camera or pivoted out of alignment with the tube 50, whereupon the slit 31 is visible to the operator through the tube 50.

I have thus provided an adjustable slit holder for sound cameras, which may be adjusted accurately both laterally and rotatably, such adjustments being simple and easy to make, and of such character as will permit adjustment to the finest degree.

Of course, many changes may be made in details of construction without departing from the spirit and scope of my invention. I do not limit myself, therefore, to the exact arrangement shown other than by the appended claims.

I claim:—

1. A slit holder for sound film devices comprising a support provided with an opening, a carrier mounted on said support having a slit member in alignment with said opening, a hollow tube member lining said opening and extending into said carrier, said carrier being rotatably adjustable and capable of being locked on said support about said tube member, a casing, said support and slit member being removable as a unit from said casing.

2. A slit holder for sound film devices comprising a fixed holder, a support adjustable laterally therein with respect to said film, and having an opening, a carrier mounted on said support having a slit member in alignment with said opening, said carrier being rotatably adjustable on said support about said opening.

3. In a sound film device, a film, a sprocket for moving said film, a light source, a slit holder, means for laterally adjusting said slit holder with respect to said film, means for rotatably adjusting said slit holder in operative relation to said film, a slit member secured in said slit holder, and tension means for holding said film in engagement with said slit member.

4. In a film sound recording device, the combination of a lamp housing, a fixed slideway, a holder member slidable therein, means for securing said holder in said slideway, means for adjusting said holder laterally therein, said second mentioned means comprising two screws one of which is supported by the lamp housing and the other of which is supported on said holder one of said screws having a lug for engaging a groove in the other of said screws, a slit carrying member on said holder, and means for rotatably adjusting the same.

5. A slit holder for sound film devices comprising a support having an opening therethrough, a shoulder around said opening, a slit carrier rotatable on said shoulder, and provided with means for locking said carrier in adjusted position, said means comprising openings in said carrier and screws smaller than said openings passing therethrough into said support.

6. A slit holder for sound film devices comprising a support having an opening therethrough, a carrier provided with a slit member, said carrier being adapted to rotatably align said slit with respect to said film, means for laterally adjusting said slit carrier with respect to said film, and locking means to maintain said slit carrier in said adjusted position.

7. In a sound film device, a film, a sprocket for moving said film, a light source, a slit holder having a slit member secured therein, means for laterally adjusting said slit holder with respect to said film and means for rotatably adjusting said slit holder in operative relation to said film.

FREEMAN H. OWENS.